Jan. 19, 1965 P. D. WOLFE 3,166,099
THERMOPLASTIC PIPE
Filed Feb. 19, 1962 3 Sheets-Sheet 3

INVENTOR
PAUL DILLON WOLFE

BY *D.R.Boyd*

ATTORNEY

United States Patent Office 3,166,099
Patented Jan. 19, 1965

3,166,099
THERMOPLASTIC PIPE
Paul Dillon Wolfe, Wilmington, Del., assignor to E. I. du Pont de Nemours and Company, Wilmington, Del., a corporation of Delaware
Filed Feb. 19, 1962, Ser. No. 174,310
2 Claims. (Cl. 138—118)

This invention relates to improved pipe made of acetal resin, and more particularly to pipe made of acetal resin having a critical degree of roll-orientation to produce maximum impact strength.

This application is a continuation-in-part of application Serial No. 27,316, now Patent No. 3,089,187, filed May 6, 1960.

It has been known heretofore to manufacture thermoplastic pipe by extrusion. Such pipe has proved to be extremely valuable for many applications. Pipes made from thermoplastics are not subject to many of the types of corrosion which destroy metal pipes, and in this respect they resemble clay or ceramic pipes, but have the advantage over the latter of lightness of weight and resistance to impact. Resistance to impact also differentiates plastic pipes from metal structures. On impact, metal pipes tend to undergo ductile deformation, pinching and closing the pipe, whereas plastic pipes rebound to substantially the original dimensions, or, in the event that the impact strength is exceeded, to fracture.

It has also been known that the mechanical properties of thermoplastics can be improved by molecular orientation. Molecular orientation is produced by the mechanical deformation of thermoplastics, in particular partly crystalline thermoplastic resins. Generally speaking, greater degrees of molecular orientation and greater improvements in properties are produced by greater deformations.

In the case of pipes made from acetal resin in which orientation substantially in the hoop direction has been achieved by rolling, a novel and surprising results has been found. Unlike properties such as the tensile strength which increase with increasing deformation, the impact strength increases to a maximum value at relatively small amounts of deformation. Further deformation decreases the impact strength. This result is particularly surprising in view of the commonly accepted explanation of the mechanical phenomena associated with the inelastic deformation of thermoplastics, that the properties are modified by molecular orientation, since molecular orientation evidently increases continuously with increasing deformation.

In the broadest sense, therefore, this invention provides pipe of acetal resin rolled to produce a degree of extension in the circumferential direction of between about 1.05 and about 1.4.

By degree of extension in the circumferential direction is meant the ratio of the mean diameter of the product pipe to the mean diameter of the unrolled pipe billet from which the product pipe is produced.

By acetal resin is meant a polyoxymethylene having a number average molecular weight of at least 15,000. There are several varieties of polyoxymethylenes which may be distinguished by the group which terminates the polymer chain substantially consisting of recurring (—$CH_2$—O—) units. For example, there are the polyoxymethylene glycols in which the terminating groups are hydroxyl, polyoxymethylene dicarboxylates in which the terminating groups are esters such as acetate or propionate, and polyoxymethylene diethers in which the terminating groups are alkyl or aryl groups joined to the polyoxymethylene chain by an ether oxygen. The principal differences between the types of polyoxymethylenes are in the thermal stability and hydrolytic stability, polyoxymethylene diethers being more stable to hydrolysis and about the same or better than in thermal stability than polyoxymethylene dicarboxylates, while the latter are better in both respects than the polyoxymethylene glycols.

The aforesaid polyoxymethylenes may be prepared by polymerizing or copolymerizing formaldehyde or trioxane alone or with minor amounts of other copolymerizable monomers such as the alkylene oxides, vinyl alkyl ethers or the like, using suitable initiators known to the art, with or without post-polymerization treatment to modify the character of the end groups or comonomer units.

Blends of polyoxymethylenes with minor amounts of other compatible, resinous materials, and particularly thermoplastic materials containing hydrogen bonding groups such as the polyamides, polyimides and the like are included in the definition of acetal resin.

Stabilizers for thermal degradation, oxidative degradation or degradation by ultraviolet radiation may be present. Minor amounts of fillers, coloring agents, nucleating agents, plasticizers, or the like may likewise be present and are specifically included in the generic expression "acetal resin," wherever employed in this specification and the appended claims.

The process by which the pipe is produced and rolled may be understood by reference to the accompanying drawings. In the drawings.

Figure 1:
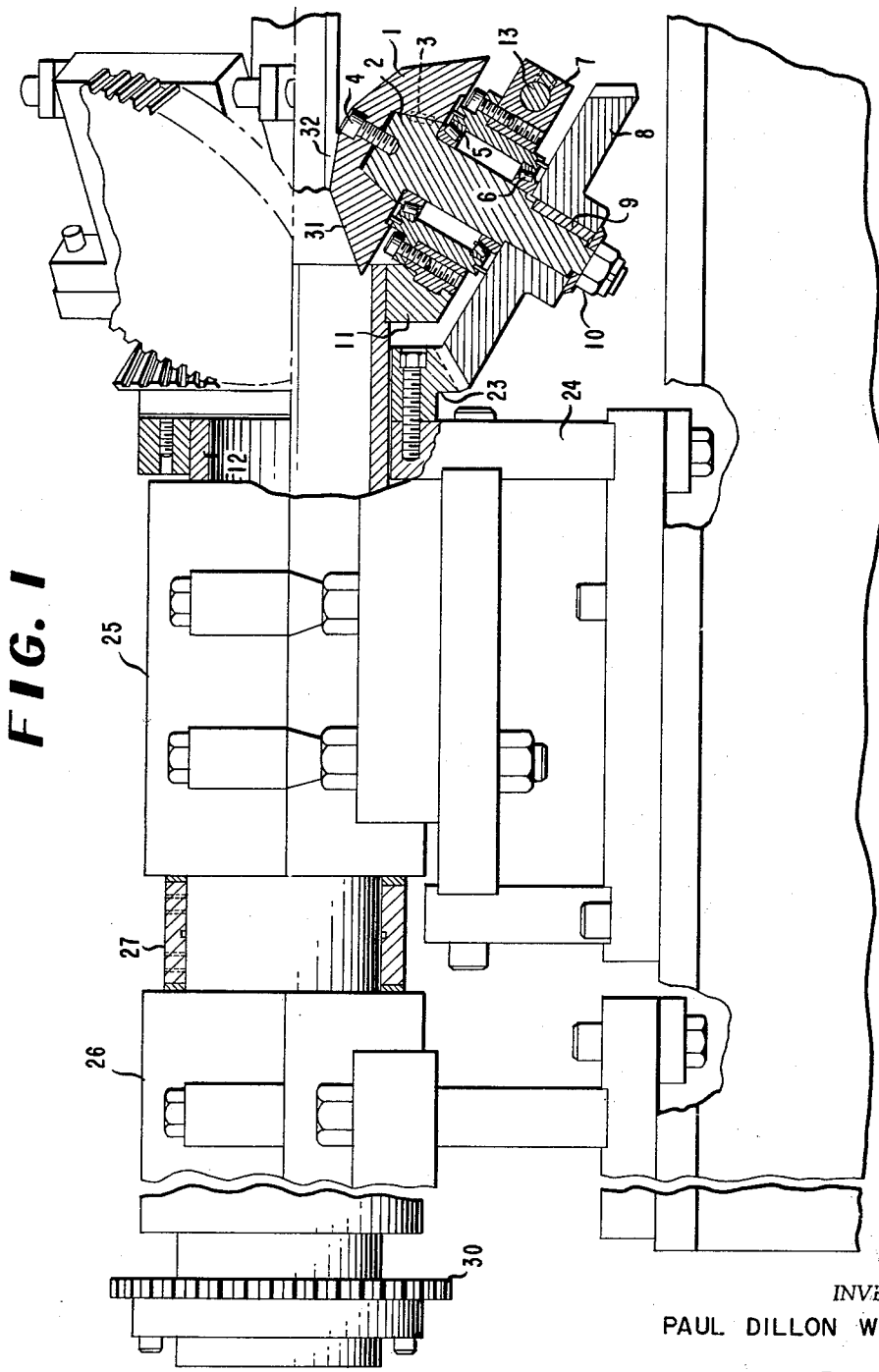
FIGURE 1 is a side elevation view, partly in cross section, of a rolling mill (with the mandrel omitted for the sake of clarity) which is suitable for the practice of thtis invention.
Figure 2:
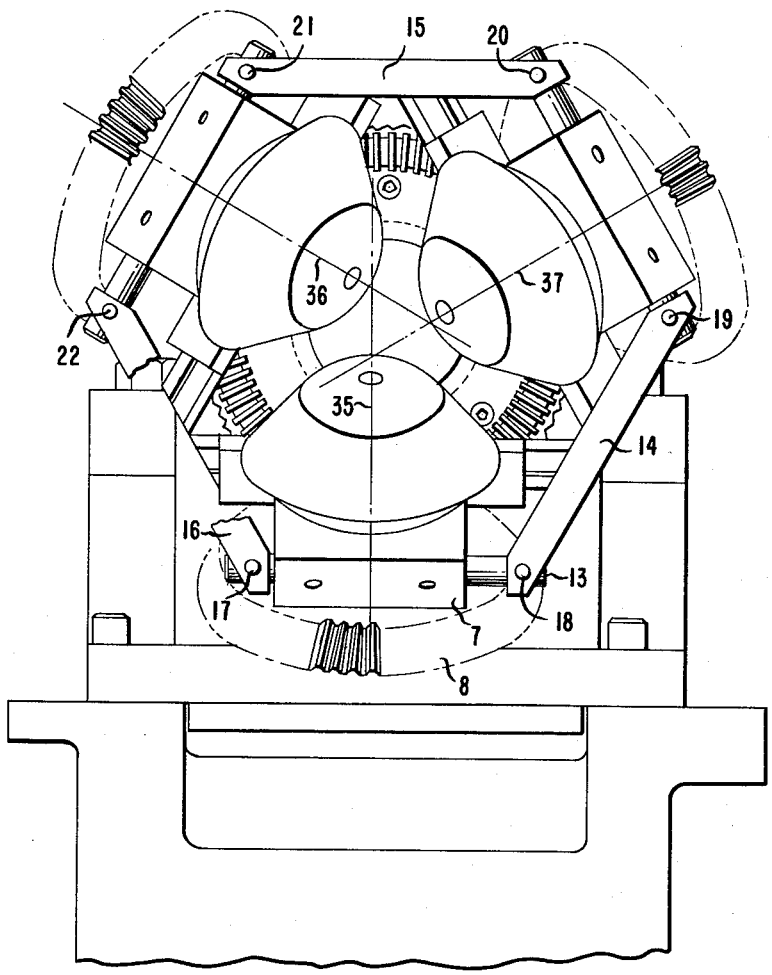
FIGURE 2 shows an end elevational view of the rolling mill of FIGURE 1.

Referring now to the accompanying drawings:

FIGURES 1 and 2 are an elevation and end view of a mill suitable for the practice of this invention. In the drawings like parts are numbered alike. The roll 1 of the mill is securely attached to its drive shaft 2 by key 3 and a screw 4. The shaft 2 rotates freely in roller bearings 5 and 6 which support the shaft and roll and are attached in turn to a frame 7. On the other side of the frame is located a bevel gear 8 which is rigidly affixed to the shaft 2 with the key 9 and the locking nut 10. The gear and roll assembly mounted on the plate 7 is adjustably located with a tongue and groove on the central plate 11 which is rigidly affixed to the hollow driving shaft 12. At the other end the plate 7 is supported by the rod 13, locking screws being provided to rigidly affix the rod 13 to the plate 7. Two other roll assemblies each identical with that described hereinabove are located at 120° from each other about the principal axis of the mill. The assemblies are supported by the common frame 11 and by bars 14, 15 and 16 which support the rod 13 and its equivalents, being secured to these bars by pairs of the taper pins 17, 18, 19, 20, 21 and 22. The bevel gear 8 (and its equivalents) rotate substantially epicyclicly about the fixed gear 23, which in turn is bolted to the bearing frame 24. The driving cylinder 12 is supported by the bearing 25 attached to the frame 24, and by a second bearing and frame 26, attached rearwardly of the bearing 25. Between the bearings 25 and 26 a thrust ring 27 is affixed to the hollow driving shaft 12, thereby supporting the rolls against axial thrust. A gear wheel 30 is also attached to the drive shaft 12 rearwardly of the second bearing 6. This gear wheel provides a means whereby the mill may be driven by a variable speed electric motor and gear train (not shown in FIGURE 1). When the shaft 12 is rotated, the rolls and gear assembly are driven epicyclicly about the central gear 23.

The rolls 1 (and its equivalents) have two conical surfaces 31 and 32. The bulk of the reduction in thickness is effected by the rolling action of the roll surface 31 against the substantially conical surface of the mandrel (not shown in these diagrams). The second surface 32 provides an initial gripping action at the cylindrical portion of the forming mandrel and has been found to assist the operation of the apparatus.

For the sake of simplicity in the following, it will be assumed that the axis of the rolls, spindles and gears intersect the principal axis of the apparatus. In this case, the action of the rolls may be understood by connecting a cone defined by the line of contact of the centrally fixed gear with an apex determined by the point of intersection of the axis of the planetary rolls with the principal axis of the entire machine. The planetary system is thus a system of cones rolling on this central cone, the apices of all the cones being coincident, and the planetary cones being defined by their respective gears. If the surface of the rolls lies in the surface of these rolling planetary cones, then the action is purely a rolling motion. However, if the surface of the rolls lies on a cone having the same apex as the rolling planetary cone but having a greater apical angle, then a shearing component of force at right angles to the line of contact is introduced which tends to feed the thermoplastic under the rolls. This situation may be termed "over-travel," signifying that the surface of the cone is driven faster than the velocity required for true rolling contact. A small amount of over-travel is of decided advantage in the rolling of many thermoplastic tubes. The rolls shown in FIGURES 1 and 2 are constructed to produce such overtravel.

The axes of the rolls are laterally displaced so that they do not intersect on the axis of the mill but pass by the principal axis so that the least distance is from 1/10 to 1/1 of the diameter of the pipe stock from the principal axis. This introduces a component of force which tends to assist the introduction of the plastic stock into the rolls. The magnitude of the offset will not in general exceed the radius of the pipe stock.

A feature of the rolls, which is of assistance to the feeding action of the offset, is the presence of a second conical surface whereby a slight rolling takes place prior to the contact of the pipe stock with the flared portion of the mandrel. The axial force required to push the stock through the mill is greatly reduced by this feature in conjunction with the offset.

Figure 3:
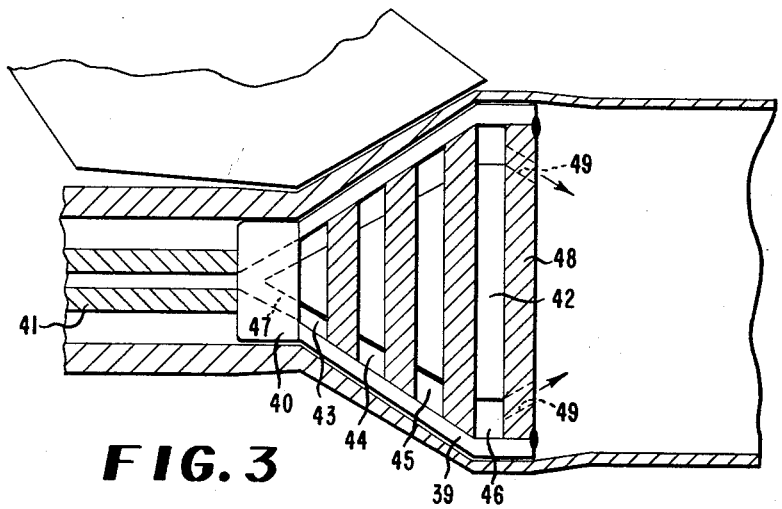
FIGURE 3 is a longitudinal cross sectional view showing the construction of a water cooled mandrel suitable for use in the practice of this invention.

Turning now to FIGURE 3, there is shown a view in section of a mandrel which may be employed in the practice of this invention in conjunction with the rolling mill shown in FIGURES 1 and 2.

The mandrel consists of an outer shell, 39 having substantially the form of a truncated cone which merges into a cylindrical section 40. The mandrel is supported by a thick-walled metal tube 41 to which it is attached. The inner core is a conical plug 42 into the surface of which is cut a series of deep circular grooves, 43, 44, 45, and 46. A slot is cut in each of the lands separating these grooves, adjacent lands being slotted at 180° to each other so that a tortuous path is provided beneath the surface of the mandrel shell. Inlets 47 connecting the first channel 43 to the tube 41 extend through the outer shell and outlets 49 extend through the final land 48 to the last groove 46 to provide an exit for the cooling water.

When a mandrel is employed in line with an extruder using a cooled mandrel at the die of the extruder on which the thermoplastic is extruded in the form of a tube, it may be desirable to pass the water into the mandrel through the annular space found between the supporting rod and the inner surface of the tube.

Figure 4:
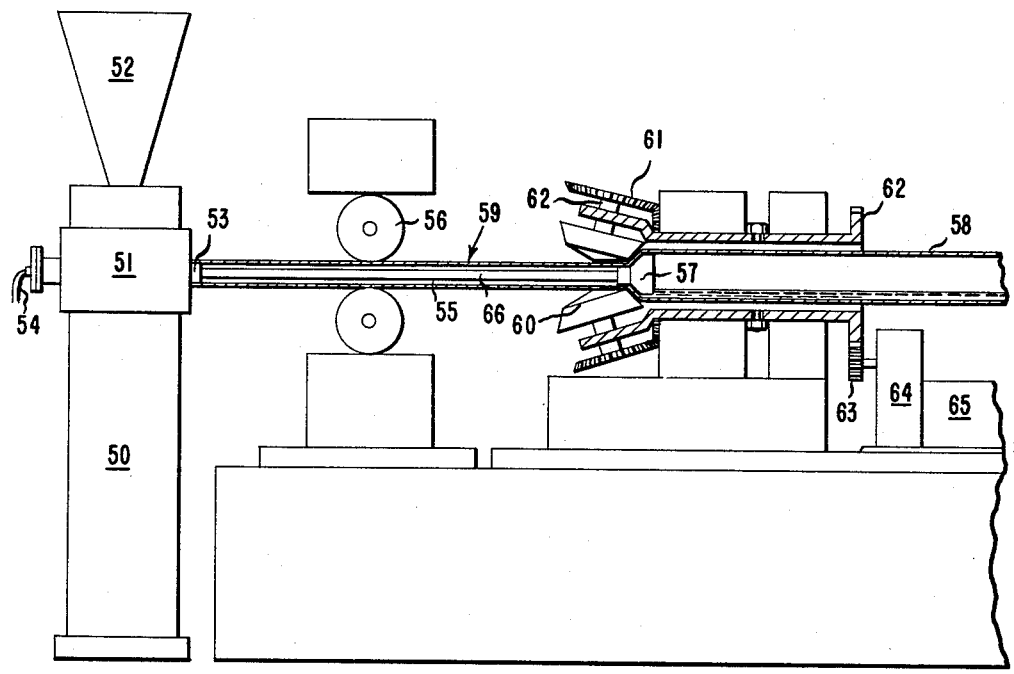
FIGURE 4 is an assembly view showing one embodiment of this invention by means of which thermoplastic pipe may be extruded and rolled to produce extremely long lengths of pipe in a unified operation.

Referring to FIGURE 4, an assembly view of a rolling mill coupled with an extruder is shown. The outlet end of an extruder 50 is shown fitted with a cross-head 51. Thermoplastic material is introduced in the hopper 52 of the extruder and plasticated by the rotation of an extrusion screw and thence urged forward into the cross-head by the action of the screw. Within the cross-head, an annular passageway is defined by the outermost part of the die and by a water-cooled inner core 53. Cooling water is supplied to the core by the tube 54. The exit water leaves by the annular space between the mandrel and the extrudate 55 and serves to cool the flared, central mandrel of the rolling mill. The thermoplastic is thus extruded as a tube, having a less diameter, and having a greater wall thickness, than the desired end product.

This method for the manufacture of tubing from thermoplastics produces stock having a greatly improved surface over stock produced by prior art methods, and has been described in greater detail in a copending application Serial No. 27,315, now Patent No. 3,103,409. In addition to being more readily adapted to the process of the present invention than prior art processes, the improved inner surface is highly desirable for use with the rolling technique, since a particularly good finish on the end product may be obtained when such stock is used. By contrast, prior art processes for the extrusion of pipe stock tend to produce tubing with a rough inner surface containing flaws which are magnified by the rolling process.

After the stock leaves the extruder, it is gripped and urged forward by rolls 56 towards the tube mill. The tube mill comprises the water cooled mandrel 57 which is supported from the center of the cooled die cone by the rod 66. The cooling water, somewhat heated from the internal extrusion core, flows through the annular passageway formed between the rod and the plastic extrudate 59, thence through and around the flare in the mandrel and out via the product tubing 58, thus serving to cool the mandrel.

Lubricants may be supplied to the outer surface of the pipe as it passes into the mill, but this is not an essential feature of the process.

The stock 59 is urged into the mill by the same gripping device which serves to withdraw the tube from the extruder. The rolls 60, which serve to reduce the stock to the desired thickness, are driven by the epicyclic gear system 61, the rolls being driven by the rotation of the shaft 62, which, in turn, is driven by the gear train 63 and 64, connected to a suitable power source such as a variable speed electric motor 65.

With regard to the dimensions of the mandrel, the diameter is clearly determined by the diameter of the desired product and by the roller system. The mandrel is substantially conical in shape when conical rolls are employed. It has been found that the included angle of the mandrel should be about 3° greater than the included angle of the rolls in order to obtain good results. An included angle of about 45° has been found to give excellent results, but the included angle may be as little as 20° or as great as 70° for various embodiments of this invention. The angle is governed in part by the requirement that the reduction in thickness per pass of each roll is small so that a substantially biaxial force system is established. The reduction in thickness per revolution is given by the expression:

$$\text{Reduction/revolution} = \frac{(\Delta t)(f)}{R \cdot L}$$

and the reduction per pass of each roll is obtained by dividing this expression by the total number of rolls. Where $\Delta t$ is the total reduction in overall thickness of the pipe stock in inches, $f$ is the feed of the stock in inches per minute, R is the revolutions per minute of the rolling head and L is the axial length of the flare of the mandrel in inches. The rolls are preferably offset so that their axes do not intersect the axis of the mill.

It has been found that the best results are obtained where the least distance between rolls and mandrel decreases lineally with distance through the mill. Thus, where conical rolls are employed with a mandrel of 45° angle the mandrel having a maximum diameter of 2.195" and a minimum of 1.180", and the axis of the rolls were displaced ⅝" from the principal axis, it was found that the surface of the mandrel cone should be concave, with a radius of curvature of 6", by geometrical construction based on scale drawings.

The temperature of the mandrel must remain uniform in order to maintain a uniform product. However, it is preferred that the mandrel be heated to a temperature of about 60° C. for most thermoplastic materials. It has been found that a sharp reduction in the power requirements for rolling and an improvement in the quality of surface in the finished tubing takes place as the temperature of the mandrel is raised to about 60° C., the exact temperature varying somewhat with the plastic. Above a mandrel temperature of about 60° C., the power required to drive the mill remains substantially unchanged until the crystalline melting point is approached. It is essential that the mandrel temperature be kept well below the crystalline melting point of the thermoplastic material which is being fabricated in order to prevent melting of the material by the mechanical work supplied. Generally speaking, the cooling fluid supplied to the mandrel should be kept at least 50° C. below the crystalline melting point of the polymer.

The rolling process may be modified in many respects, for example, the diameter of the stock may be increased by passing the stock through two or more mills in succession.

The impact strength is a relatively imprecise term, and the values obtained by test methods vary with the method of test. The results obtained by test methods are comparable for a given geometry of sample and provide an extremely valuable index of performance under actual operating conditions in the field.

In the following examples, the test procedure for impact strength was as follows:

Samples of pipe are cut to a length of 5"±⅛" and placed on an anvil consisting of a sheet of steel machined to provide a V surface with an angle of 170°. A steel cylinder having a weight of 16.8 pounds and having a circular impacting face with a diameter 0.71 times the diameter of the pipe to be tested is used as the impacting device. By varying the diameter of the impacting weight with the diameter of the pipe in this manner, it has been found that the type of fracture produced remains substantially the same. Results for pipe of differing sizes may be compared by dividing by the weight per unit length.

In order to perform the test, the pipe specimen is placed on the anvil, which should be free from the fragments of pipe remaining from previous tests and the weight is suspended vertically over the axis of the pipe from a stand having a reliable clamp. The height, measured as the distance between the impacting surface at the bottom of the cylinder and the top of the pipe specimen resting on the anvil, is adjusted to a value roughly equal to the height expected for failure of 50% of the samples. The cylinder is released and permitted to drop onto the sample. After testing, the sample is graded as a failure if it is cracked or broken in any way.

If the sample is not broken or cracked in any way, it is graded as "support." If the test specimen is graded "failure," the succeeding test is made at a drop height lower by an interval I than the preceding test. If the test specimen is graded "support," the next test is made at a drop height greater by I than the preceding test. The interval I is taken as ¼' for a 50% break height of 2' or less and ½' for a 50% break height of more than 2'. Proceeding in this manner, a minimum of ten samples from the pipe are tested, and preferably thirty samples.

The results of these tests should be tabulated by height of drop, and the number of failures. The mean break height is then determined by the following formula $$\overline{X} = H_0 + I \frac{\sum \omega_H N_H}{\sum N_H} - \frac{1}{2}$$

In this formula
$\overline{X}$ is the mean break height,
I is the interval, defined hereinabove, in feet,
$H_0$ is the lowest height of the drop weight,
$N_H$ is the number of failures at height H, and
$\omega_H$ is the number of intervals, I, between H and $H_0$.

The results of the test are conveniently expressed in foot-pounds by multiplying the mean break height $\overline{X}$ by the impact weight in pounds.

The impact strength of pipes made from acetal resin depends somewhat on the degree of moisture present. In order to eliminate this variable, the samples employed were conditioned to 50% relative humidity at 23° C. for five days preceding the test.

EXAMPLES

The following examples show the properties of pipe made from acetal resin containing a filler of carbon black in an amount between about 0.3% and 1.4% by weight. The acetal resin was a commercial material substantially as described in the patent to R. N. MacDonald, U.S. 2,768,994, issued on October 30, 1956, and had acetate end groups. Pipe stock was fabricated from this polymer and rolled as described hereinabove. The mandrel angle of the rolling mill was 17°20' measured from the axial line. Three rolls in the form of truncated cones were employed, the radius at the apex of the cone being 0.925". The angle of the conical surface of the rolls was 28° with respect to the roll axes. The roll axes were set at an angle of 45° to the machine axis.

The properties of the rolled pipe so produced, together with other pertinent fabrication data are shown in Table I.

*Table I.—Impact strength of roll-oriented acetal resin pipe*

| Example No. | Dimensions of Product Pipe (in.) | | Dimensions of Pipe Stock (in.) | | Extension in Circumferential Direction | Characteristics of Rolling | | | Impact Strength, ft.-pounds |
| --- | --- | --- | --- | --- | --- | --- | --- | --- | --- |
| | Diameter | Thickness | Diameter | Thickness | | Billet Temperature, °C. | Linear Rate, in./min. | Offset of Rolls (in.) | |
| I | 2.400 | 0.070 | 2.400 | 0.070 | 1.00 | (Extruded Control) | | | 44 |
| II | 2.390 | 0.070 | 2.150 | 0.100 | 1.14 | 45 | 15 | 9/16 | >250 |
| III | 2.380 | 0.075 | 1.115 | 0.127 | 1.6 | 45 | 15 | 9/16 | 200 |
| IV | 2.380 | 0.075 | 1.370 | 0.145 | 1.9 | 45 | 15 | 9/16 | 188 |

The above examples clearly show a surprising maximum in impact strength at low degrees of deformation.

In other examples, the variation of impact strength at constant circumferential extension was studied. At axial extensions between about 1.0 and 1.25, no effect could be established, above extensions of about 1.25, a slight improvement in impact strength was detected which was, however, substantially less than the improvement demonstrated hereinabove with circumferential extension.

I claim:
1. As an article of manufacture, seamless pipe of acetal resin, roll-extended substantially in the circumferential direction to a degree of extension in the range between about 1.05 and about 1.4.
2. The article of claim 1 in which the acetal resin contains between about 0.3 and 1.4% by weight of carbon black.

References Cited in the file of this patent

UNITED STATES PATENTS

| | | |
|---|---|---|
| 2,244,208 | Miles | June 3, 1941 |
| 2,708,772 | Moncrieff | May 24, 1955 |
| 2,752,637 | Walker et al. | July 3, 1956 |
| 2,761,336 | Greene et al. | Sept. 4, 1956 |
| 2,961,711 | Diedrich et al. | Nov. 29, 1960 |
| 3,035,302 | Lysobey | May 22, 1962 |